United States Patent [19]

Schöpf et al.

[11] Patent Number: 4,817,454

[45] Date of Patent: Apr. 4, 1989

[54] ROTARY BODY SUBJECTED TO CENTRIFUGAL FORCES

[75] Inventors: Hans-J Schöpf, Stuttgart; Wolfgang Kizler, Fellbach; Wolfram Dahm, Nürtingen; Rudolf Thom, Stuttgart, all of Fed. Rep. of Germany

[73] Assignee: Daimler-Benz Aktiengesellschaft, Stuttgart, Fed. Rep. of Germany

[21] Appl. No.: 258,559

[22] Filed: Apr. 29, 1981

[30] Foreign Application Priority Data

Apr. 29, 1980 [DE] Fed. Rep. of Germany ....... 3016441

[51] Int. Cl.$^4$ .............................................. G05G 1/00
[52] U.S. Cl. .................................... 74/572; 74/573 R
[58] Field of Search ................................. 74/572, 573

[56] References Cited

U.S. PATENT DOCUMENTS

| 2,047,420 | 7/1936 | Lee | 74/572 |
| 2,282,071 | 5/1942 | Marsal et al. | 74/572 |
| 3,838,464 | 9/1974 | Doyle | 74/573 |
| 4,267,805 | 5/1981 | Schmuck | 74/572 |

FOREIGN PATENT DOCUMENTS 1001538 8/1965 United Kingdom .................. 74/572

Primary Examiner—Alexander Grosz
Assistant Examiner—Rodney M. Lindsey
Attorney, Agent, or Firm—Barnes & Thornburg

[57] ABSTRACT

A rotary body adapted to be subjected to centrifugal forces, with the rotary body including a load ring carried by a wheel disk or the like. The load ring is defined between two enveloping or surrounding cylindrical surfaces which respectively define the inner and outer peripheral surfaces of the load ring. The inner cylindrical surface has a diameter $D_i$ with the outer cylindrical surface having a diameter $D_a$. At least one axially extending vacant bore is arranged in the load ring, with the bore being disposed at a position spaced from a center of rotation of the rotary body by a distance which is less than $\frac{1}{4}(D_i+D_a)$.

18 Claims, 4 Drawing Sheets

ROTARY BODY SUBJECTED TO CENTRIFUGAL FORCES

The present invention relates to a rotary body construction and, more particularly, to a rotary body subjected to centrifugal forces, with the rotary body including a load ring carried by a wheel disk or the like, the load ring extending within or being defined between two annular cylindrical surfaces defining an inner and outer surface of the ring.

Rotary bodies of the aforementioned type may, for example, be a flywheel of a reciprocating piston engine; however, the proposal of the present invention is also applicable to other machine components of the same type such as, for example, high speed gear wheels, turbine rotors, or the like.

In flywheels for engines of passenger motor vehicles, a separating clutch is provided and is usually built in or secured to the flywheel, with the clutch being adapted to enable a changing of gear speeds of a transmission. In order to enable an assembly of the separating clutch to the flywheel, a series of threaded bores are positioned along the load ring. Additionally, in order to ensure a proper balancing of the rotary body formed as flywheel, balancing bores are also provided in the load ring.

As can readily be appreciated, the provision of such bores whether balancing bores or constructionally necessary bores for securing, for example, the separating clutch, results in a weakening of the material cross section thereby bringing about local excessive stresses. Since the position and size of the balancing bores cannot be established in advance of the manufacturing of a flywheel, in some situations, with an unfavorable configuration of the constructionally necessary bores, it occurs that excessive stresses which closes approach the maximum permissible stress may occur in the flywheel.

The aim underlying the present invention essentially resides in providing a guide for an arrangement of bores in high speed rotary bodies which minimizes the size of the amount of unavoidable excess stress which occurs during rotation of the body.

In accordance with advantageous features of the present invention, a rotary body, adapted to be subjected to centrifugal forces, is provided which includes a disk portion in a load ring defined between inner and outer cylindrical surfaces forming the inner and outer peripheral surfaces of the load ring. As least one axially extending bore is provided in the load ring, with the bore being positioned radially outwardly from a center of rotation of the rotary body at a distance from the center of rotation which is less than one quarter of an arithmatic mean diameter of the inner and outer diameters of the inner and outer cylinders forming the inner and outer peripheral surfaces of the load ring.

Advantageously, in accordance with further features of the present invention, the at least one axially extending bore in the load ring is positioned at an optimum distance from a center of rotation of the rotary body such that a peripheral stress in the load ring and at an inner surface of the bore at a radially inner most point of the bore is of equal magnitude to a radially outermost point.

In accordance with the present invention, with at least two axially extending bores of about equal diameter arranged adjacent to each other and about an equal distance from the center of rotation of the rotary body, advantageously, a distance between centers of the axially extending bores is less than 1.5 times and greater than one half of the diameter of the bores.

In order to balance the rotary body, the weight removed from the load ring may be divided among several load ring bores by which a partial load is drilled or removed from the load ring, with the several load ring bores being axially extending and being as small as possible as well as being arranged closely adjacent to a common distance from the center of rotation of the rotary body. The several load ring bores are spaced from each other by a mutual distance between the respective centers which is less than 1.5 times and greater than 0.5 times the bore diameter. Advantageously, adjacent load ring bores may be formed with different depths.

It is also possible in accordance with the present invention for a partial load to be drilled away from the load ring for balancing purposes with only a single balancing bore which is dimensioned as small as possible in diameter but as long as possible in an axial direction and disposed so that the balancing bore radially inwardly from an end face, i.e., outside peripheral face, on one side of the load ring.

The rotary body may be provided with a connection which, as viewed in an axial direction, is eccentric of the load ring and a wheel disk body. A bore may be arranged as far as possible from the end face of the load ring projecting away from the wheel disk body. In accordance with still further features of the present invention, radial bores may be provided and be positioned axially outwardly in a region on a side of the surface center of gravity of the cross section of the load ring.

The axial bores may be positioned on an end face of the load ring facing the wheel disk body and, as also possible, the bores may end or terminate in the load ring.

Advantageously, a depth of the axially extending bores is at most about two-thirds of an axial dimension of the load ring.

With two axial bores positioned at different radial positions but at the same peripheral position, with a radially outer one being positioned in the load ring, a mutual distance of centers of the two bores is greater than a distance of centers of the outer bore from the outer edge of the load ring together with half of a diameter of the inner bore.

In a rotary body provided with two neighboring axially extending bores positioned at different radial positions and different peripheral positions, the two axially extending bores have a spacing in a peripheral direction from one another such that two center lines which lie facing one another and are tangential to the axial bores delimit a segment of an arc on a partial circle of the outer bore having a length which is greater than twice a diameter of the larger of the two bores.

In accordance with the present invention, with an axial bore positioned in a region of a radial bore of the load ring, a distance between axial lines of the bores is greater than $D/4+d/2$, where $D$ is a diameter of the radial bore and $d$ is a diameter of the axial bore.

With two axial bores positioned at different radial positions but about the same peripheral position, of which a radially outer bore is positioned in the load ring, a mutual distance of centers of the two bores is greater than three times the diameter of the larger of the two bores.

Advantageously, a radial bore may be positioned with respect to its axial position in the load ring such that the peripheral stresses are equally large in the two hole inner surface points which are axially opposite with respect to an axial of the load ring.

Accordingly, it is an object of the present invention to provide a rotary body which avoids, by simple means, shortcomings and disadvantages encountered in the prior art.

Another object of the present invention resides in providing a rotary body subjectable to centrifugal forces which is simple in construction and therefore relatively inexpensive to manufacture.

Yet another object of the present invention resides in providing a rotary body which is subjected to centrifugal forces which minimizes if not avoids the occurrence of stress peaks.

Yet another object of the present invention resides in a rotary body which enables, with predetermined structures and materials, to provide for higher component reliability.

A still further object of the present invention relates to a rotary body subjected to centrifugal forces which enables the use of less expensive material than heretofore possible without the present invention.

These and other objects, features, and advantages of the present invention will become more apparent from the following description when taken in connection with the accompanying drawings which show, for the purposes of illustration only, several embodiments in accordance with the present invention, and wherein.

Figure 11:
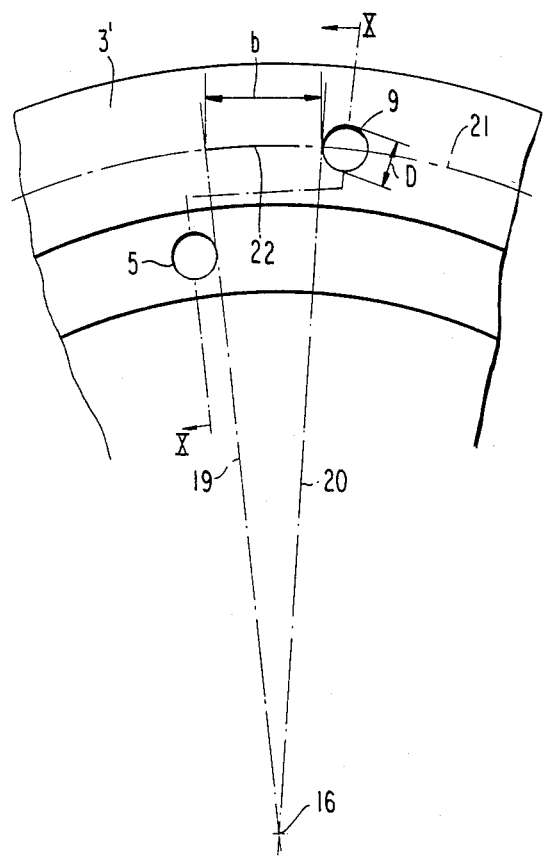
Figure 12:
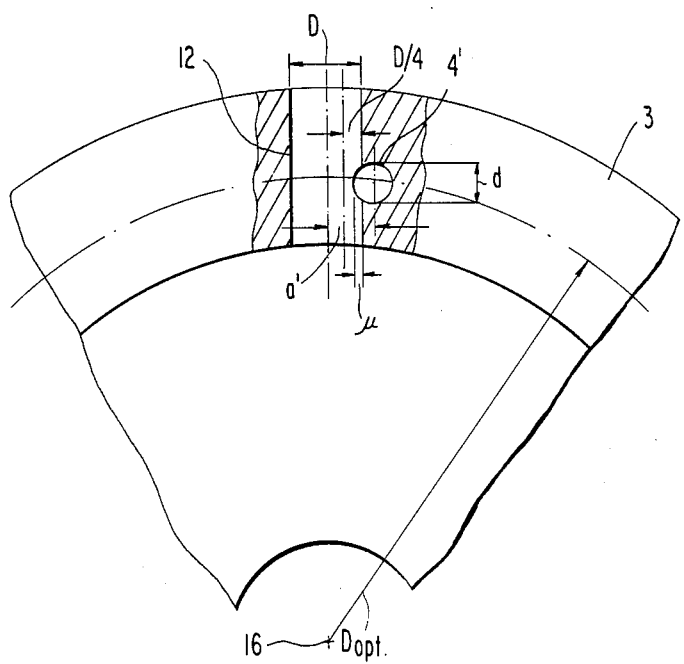

FIG. 11 is an end view of a rotary body constructed in accordance with the present invention illustrating an optimum arrangement of two axially extending bores arranged radially closely adjacent to one another in a load ring; and FIG. 12 is a partial cross sectional view of a permissible arrangement of a radially extending bore in a load ring with a closely adjacent axially extending bore in a rotary body constructed in accordance with the present invention.

Figure 1:
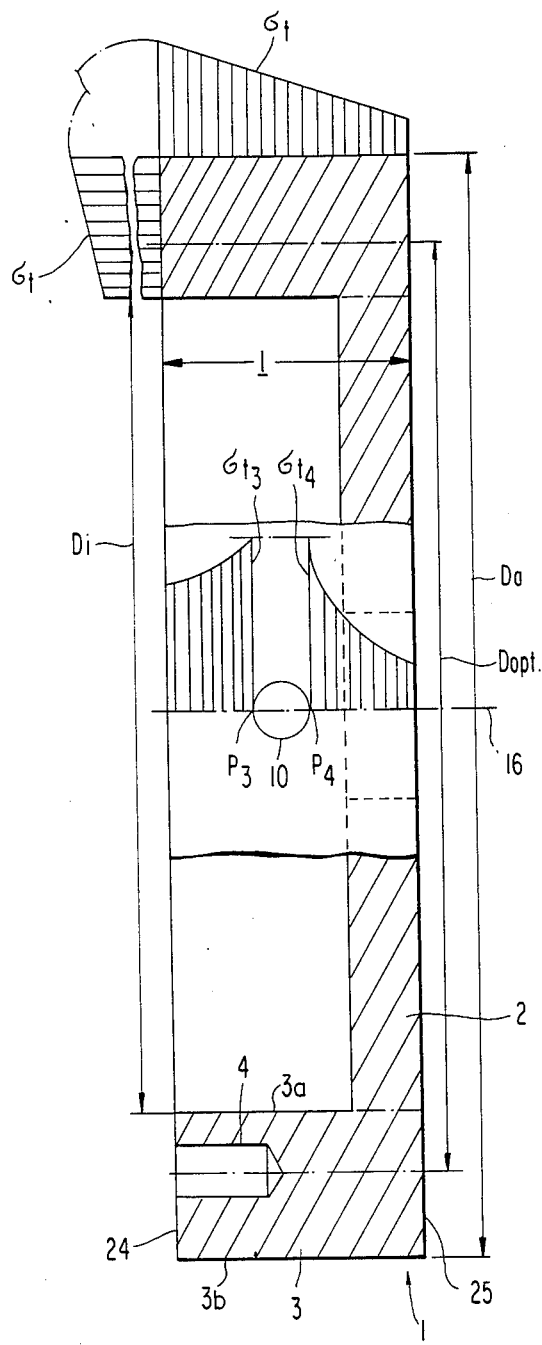
FIG. 1 is a partial cross sectional view through a rotary body constructed, for example, as a flywheel, in accordance with the present invention with an exterior annular mass concentration and with bores provided in a load ring.

Referring now to the drawings wherein like reference numerals are used throughout the various views to designate like parts and, more particularly, to FIG. 1, according to this Figure, a rotary body generally designated by the reference numeral 1 includes a wheel disk body portions 2 and a load ring 3 arranged at an outer periphery of the body portion 2. The disk body portion 2 may be fashioned as a closed disk integrally formed with the load ring 3 or provided with cutout similar to a spoke wheel. It is also possible for the body portion 2 to be formed as a separate component to which the load ring is fastened by, for example, screws or the like.

As shown in the drawings of the rotary body 1, the wheel disk body portion 2, as viewed in an axial direction is eccentrically attached, i.e., on one side, to the load ring 3, which arrangement is a prerequisite for the following proposals. More particularly, with an eccentric attachment of the load ring 3 to the wheel disk body portion 2, high moments occur which tend to cause a curling or turning inside out, which moments tend to increasingly bend a free end face 24 of the load ring 3 outwardly. Because of this, a radially outwardly rising course of peripheral stress $\sigma_t$ is recorded when the load ring 3 is eccentrically arranged. At an outer side of the load ring 3, the peripheral stress falls off along a convex surface line toward a closed end face 25 facing the wheel disk body portion 2.

Figure 3:
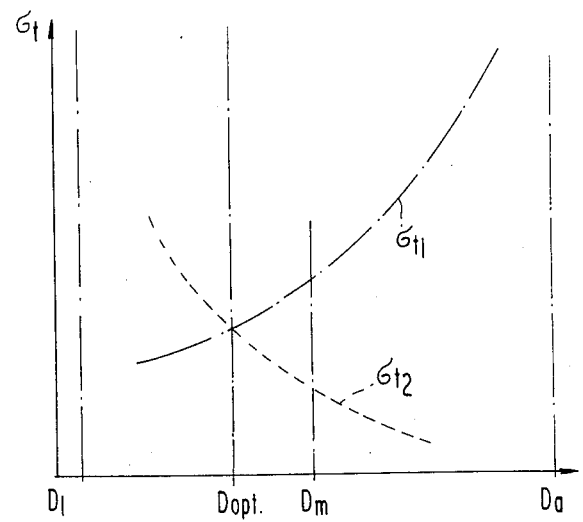
FIG. 3 is a stress diagram for determination of radially optimum positions of an axially extending bore.

With regard to the geometery of the load ring 3, the load ring 3 has an axial length 1 and extends between two annular coaxial cylinders having diameters $D_1$, $D_a$, respectively so as to define inner and outer surface 3a, 3b of the load ring 3 with an arithmatic mean diameter of the two diameter $d_1$, $d_a$, being designated by the reference character $d_m$ (FIG. 3). The geometric center of the rotary body 1 and center of rotation is designated by the reference numeral 16.

Bores of different positions and sizes are arranged in the load ring 3, the nature of the bores, initially, is of secondary importance. Thus, for example, the bores may be constructionally necessary or take the form of balancing bores; however, the considerations set forth hereinbelow, hold equally for either type of bore, that is, the constructional features of the rotary body 1 as set forth hereinbelow can be used for constructionally required bores as well as balancing bores.

Figure 2:
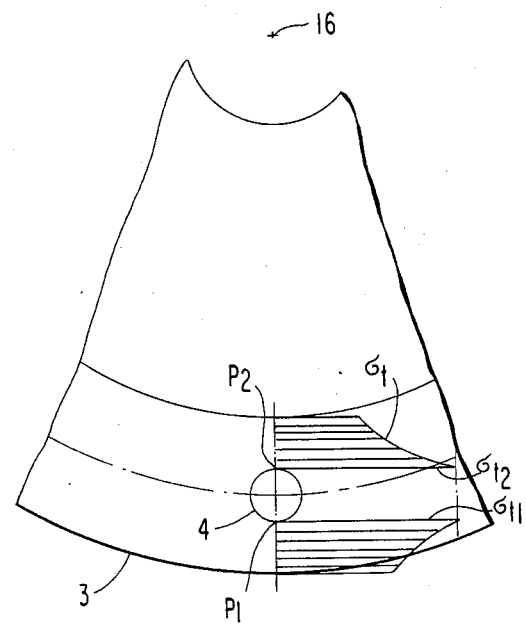
FIG. 2 is a partial end view of the rotary body of FIG. 1 in a region of an axially extending bore.

A shown in FIGS. 1 and 2, by positioning of the bores in the load ring 3, a local excess stress $\sigma_t$ arises due to a reduction in cross section of the material and to the notching action for an axially extending (see FIG. 1) bore 4 or a radially extending bore 10 (See FIG. 1). One of the more important considerations for the arrangement of an axially extending bore 4 is that the bore 4 should be position radially within the inner and outer surfaces 3a, 3b of the load ring 3 at the average diameter $D_m$. A radial length of the axially extending bore 4 has a very great influence on the extend of excess stress created at edges of the bore 4 and it can be said that, in each case, as shown in FIG. 3, an optimum point lies at a point at which the excess stress $\sigma_{t1}$ at a radially outer point $P_1$ is exactly as large as a stress $\sigma_{t2}$ at an inner point $P_2$ of the axially extending bore 4 it has been found that, ideally, the bores should be spaced from the center of rotation of the body by a distance which is less than $\frac{1}{4}(D_i+D_2)$.

As apparent from the stress diagram of FIG. 3, when a radial position of an axially extending bore 4 is varied, an excess stress at the radially outer point $P_1$ with respect to the center of rotation 16 increases strongly with an increasing center distance and, opposed to this, an excess stress at a radially inner point $P_2$ decreases strongly with the increasing center distance. At a point of intersection of the two curves $\sigma_{t1}$ and $\sigma_{t2}'$ both excess stresses are of equal magnitude. The position of the point of intersection represents, in the stress/diameter diagram of FIG. 3, a position of the optimum diameter $D_{opt}$, which is less than the average diameter $D_m$. This recommendation is only relatively dependent upon a diameter of the bore 4, that is, the recommendation is valid without considerable deviations within a judicious range of diameters of the bore 4. However, it is very difficult to provide a recommendation for ascertaining an optimum radial position since a geometery of the load ring 3 has to be taken into account in such a situation. Experimental determinations for an optimum radial position also leads to useable results in each case, even with load rings of complicated shape. For an experimental determination, known optical stress methods with built-in stress states are available. It is also possible to utilize a procedure which consists of positioning axial bores at different radial positions in a prototype of a rotary body 1 and to determine a hoop stress in the load ring 3 at the whole inner surfaces at points $P_1$ and $P_2$ with strain gauges during rotation of the rotary body 1, and to determine an optimum radial position of the axially extending bores 4 graphically in accordance with the stress/diameter diagram of FIG. 3.

Figure 4:
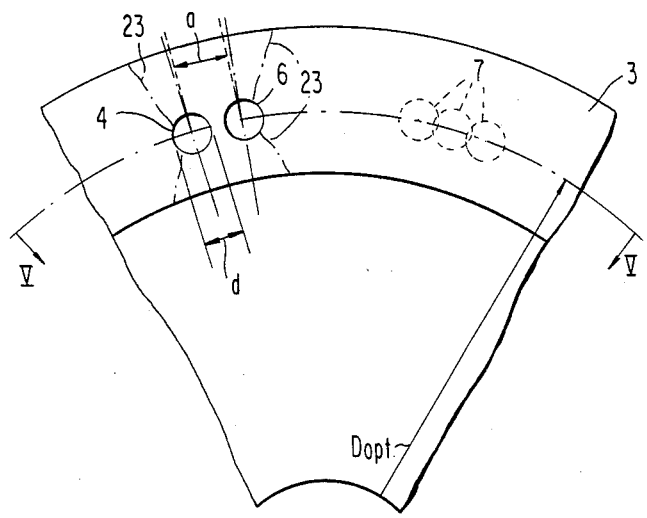
FIG. 4 is an end view of a rotary body of the present invention illustrating permissible or recommended arrangements of axially extending load bores in a load ring.

From a viewpoint of local excess stress, it is immaterial as, as shown in FIG. 4 a further load ring bore 6 of about the same diameter is positioned at the same, preferably optimum, center distance, and at a close spacing from the axially extending bore 4 in the load ring 3. With a condition that the mutual distance a between the centers of the two bores 4, 6 is less than 1.5 times a diameter d of the bore 4 or 6, a decrease of the stress peak is achieved as against a single arrangement of an axially extending bore.

With an adjacent arrangement of axial bores at the same diameter and close together at about the same center distance, the positions of the highest peripheral stress in the load ring are displaced away from the points $P_1$ or $P_2$ shown in FIG. 2 in a direction toward the greater cross sections of the material as indicated in phantom lines 23 in FIG. 4. For example, if the concern is only to drill away from the load ring 3 a given partial mass at a given peripheral point, it is better to provide, as shown most clearly in FIG. 4, several closely adjacent bores 7. The bores 7 can intersect insofar as this is technically possible to achieve, without deleteriously acting toward the creation of excess stress.

Figure 5:
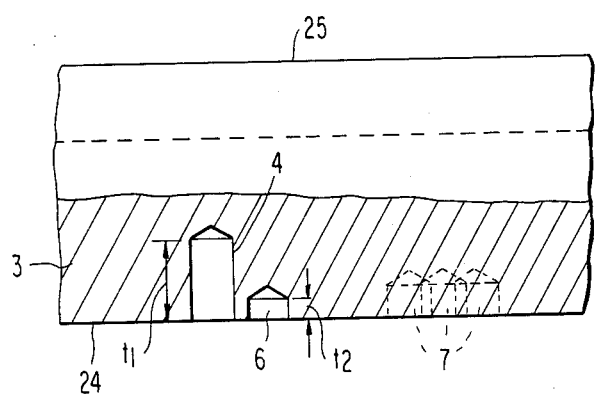
FIG. 5 is a developed peripheral partial cross sectional view of a rotary body of the present invention again illustrating permissible or recommended arrangements of axially extending bores in the load ring.

For practical considerations, off center drilling of small bore volumes per drilling step, about half of a diameter of the bore may be selected as a lower limit for a distance between the centers of the bores 7. For strength reasons, a slotted hole with a circular arcuate course attained by, for example, an end milling cutter, is also possible. As far as the individual bores lie close enough together, they can also have, as shown in FIG. 5, different depths such as, for example, bore depth $t_1$, and $t_2$. the smaller bore 6 with a depth $t_2$ may, for example, be occasioned by the need to provide a subsequent balancing of the rotary body 1. The different bore depths $t_1$, $t_2$ is not relevant from a viewpoint of undesired excess stress, i.e., the excess stress brought about by a deeper bore depth $t_1$ is not greater because of further axial extending bore of a smaller depth is positioned closely adjacent thereto.

Figure 6:
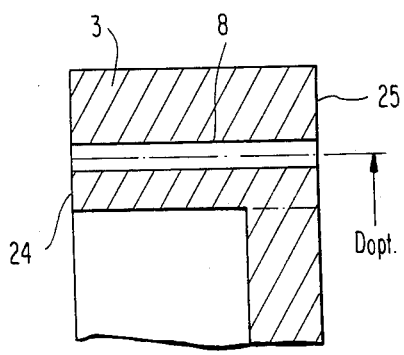
FIG. 6 is a partial cross sectional view of an optimum arrangement of a single axially extending bore in a load ring of the rotary body of the present invention.

In fact, as noted above, a diameter of the axially extending load ring bores has no or only a negligible influence or effect on an optimum radial positioning of the bores in the load ring 3. However, the diameter of the respective bores has a considerable influence on the magnitude of excess stress itself. Axially extending load ring bores 4, 6, 7, and in particular those bores which, with an eccentric arrangement of the load ring 3, have to be positioned from a free end face 24 of the rotary body 1 are, if at all possible, to be kept to as small a diameter as possible. Hence, if a given partial mass is to be drilled out at a given peripheral position, it is appropriate, for this purpose, to provide a small bore which as long as necessary, for example, as shown in FIG. 6, a through bore rather than several bores of greater diameter. The bore 8 of a smaller diameter is less deleterious than several closely adjacent bores of a greater diameter.

Figure 7:
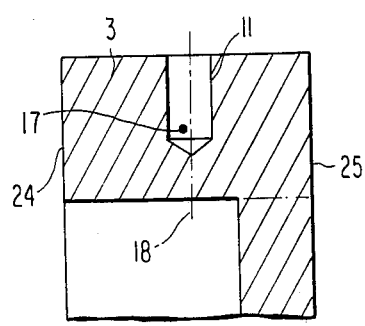
FIG. 7 is a partial cross sectional view of a rotary body constructed in accordance with the present invention with a radially extending bore being disposed in the load ring.

However, with an eccentric arrangement of the load ring 3 on the wheel disk body 2, it is more favorable, because of a course of the peripheral stress which falls away from the free end face 24 toward the rear end face 25, to position the bores and, in particular, balancing bores, as far away as possible from the free end face 24 as the constructional circumstances permit. With an eccentric arrangement of the load ring 3, the free end face 24 is the most notch-sensitive face. Radially extending bores 11, as shown most clearly in FIG. 7 are appropriately positioned in a region disposed on this side of a surface center of gravity 17 of the cross section of the load ring 3. That is, a bore axis then lies, as seen in the axial cross section of FIG. 7, approximately on or to the right of a surface centroidal axis 18. Optimally, a radially extending bore 11 is positioned with respect to its axial position in the load ring such that, as shown in FIG. 1, hoop stresses $\sigma_{t3}$ and $\sigma_{t4}$ in the two axially opposite, relative to the load ring axis 16, hole inner surface points $P_3$ and $P_4$ are of equal magnitude. The positioning of the radially extending bores 10 can be experimentally determined similarly to a determination of the optimum radial position of the axially extending bores 4 described hereinabove in connection with FIGS. 2 and 3.

Figure 8:
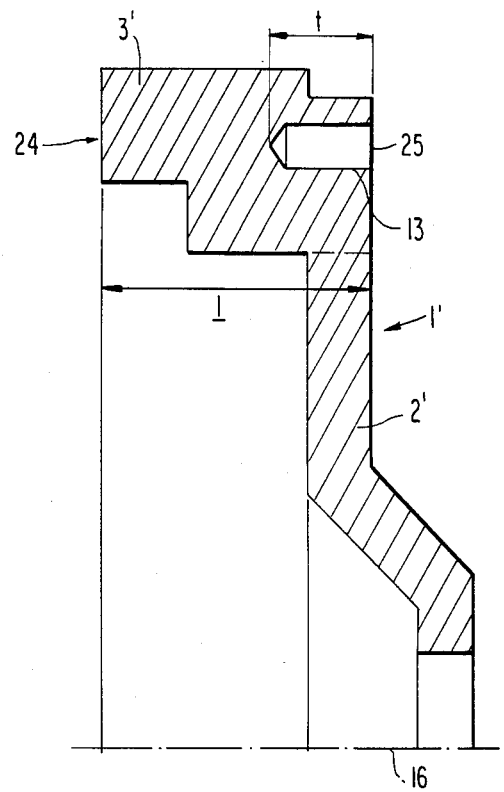
FIG. 8 is a partial cross sectional view of another embodiment of a rotary body constructed in accordance with the present invention and which provides an illustration of an optimum position for a rearward axially extending bore in the load ring.

As shown most clearly in FIG. 8, a rotary body generally designated by the reference numeral 1' may be provided which includes a wheel disk body 2' and a load ring 3' arranged at an outer periphery of the disk body 2'. As with the rotary body 1, the wheel disk body 2' may be fashioned as a closed disk which is integrally formed with the load ring 3'; however, the disk body may also be provided with cut outs resulting in a spoked wheel configuration. Likewise, the wheel disk body 2' may also be constructed as a separate component and adapted to be fastened to the load ring 3' by a suitable fastening arrangement. As with the rotary body 1, the wheel disk body 2' as viewed in an axial direction, is eccentrically disposed with respect to the load ring 3', i.e., disposed to one side of the load ring 3'.

With an eccentric arrangement of the load ring 3 or 3', the rearward end face 25 facing the wheel disk body 2 or 2' is still less notch sensitive than a peripheral side lying outwardly due to which bores, for example, bore 13 is FIG. 8, is positioned as far as possible on the end face 25. Considering a rising course of the peripheral stress toward the opposite end face 24 of the load ring 3 or 3', it is appropriate for a rearward arrangement of axially extending bores that they are not brought through to the opposite side but end or terminate within the load ring 3 or 3'. It is also appropriate to make the depth of the bores only about two-thirds of an axial length 1 of the load ring 3 or 3'. With these conditions, a maximum stress at the edge of the bore is not higher than a maximum stress at a free end face 24 without a bore.

Figure 9:
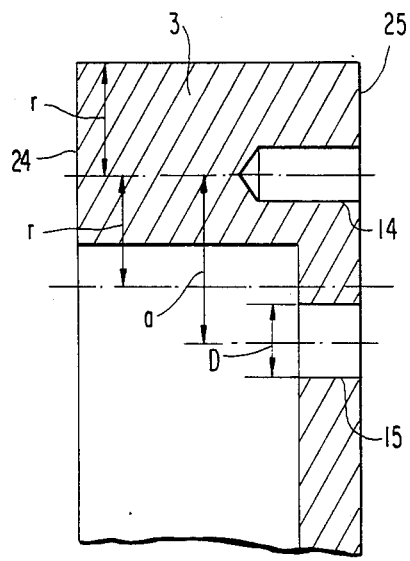
FIG. 9 is a partial cross sectional view of an optimum positioning of two axially extending bores of equal diameter in a rotary body constructed in accordance with the present invention.

It frequently happens that adjacent axial bores have to be positioned at different radial positions and, with respect to excess stresses, these situations are relatively unfavorable since with closely adjacent bores at different radial positions, one bore is arranged in a region of excess stress of the other bore. Such a negative mutual influence of axially extending bores may be avoided if, with approximately peripherally equal arrangement of two axially extending bores, of which a radially outermost one is optimally radially arranged, the mutual distance a between the centers of the two bores is, as shown in FIG. 9, greater than an edge facing r of the radially outer bore 14 together with half of a diameter D of the inner bore 15. Another consideration with the same object is that a distance a between the centers should be greater than about three times a diameter A of the larger of the two bores.

Figure 10:
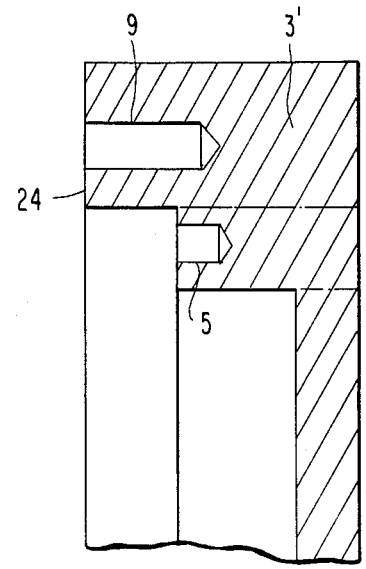
FIG. 10 is a partial cross sectional view taken along the line X—X in FIG. 11.

As shown in FIG. 3, taking into account the last mentioned considerations amounts, in practice, to disposing the radially inner bore 15 at a position other than the load ring 3. However, if these considerations cannot be taken into account, that is, if the bores, from a radial viewpoint, cannot be shifted apart sufficiently, due to constructional requirements, the bores must retain a sufficiently large mutual spacing in a peripheral direction. Mutual influence of the excess stresses of the two axially extending bores may, as shown in FIGS. 10 and 11, be avoided if two diametrical or center lines 19 and 20 extending tangentially to an axially extending bore 5 or 9 and facing each other subtend an arc segment 22 such that a length b of the arcuate segment 2 is greater thant twice a diameter D of a greater of the two bores 5, 9.

As shown in FIG. 12, a radially extending bore 12 and an axially extending bore 4' may be brought substantially closer to each other in a peripheral direction with an axial line distance a' being selected so as to be so small that there results an intersection $\mu$ of the axially extending bore 4' and radially extending bore 12. An amount of the intersection between the bores 4', 12 should not be greater than one quarter of a diameter D of the radial bore 12, that is, an axial line distance a' should not be less than $D/4 + d/2$, where d represents a diameter of the axially extending bore 4'. In the embodiment of FIG. 12, an optimum radial position for the axial bore 4' is presupposed.

As noted above, by virtue of the features of the present invention, stress peaks can be eliminated and, with predetermined structures and materials, such elimination of stress peaks leads to higher component reliability.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A rotary body subjected to centrifugal forces, comprising a disk portion, and a load ring carried by the disk portion, the l load ring including inner and outer peripheral surfaces respectively defined by an inner cylindrical surface having a diameter $D_i$ and an outer cylindrical surface having a diameter $D_a$, at least one bore extending in an axial direction of the rotary body and disposed at an optimum position in the load ring, said optimum position being spaced from a center of rotation of the rotary body by a distance which is less than $\frac{1}{4} (D_i + D_a)$ and arranged at a position where a peripheral stress at a radially innermost point of said at least one bore is equal to a peripheral stress at a radially outermost point of said at least one bore, whereby reduction in strength of said load ring by the disposition of at least one bore therein is minimized by the optimum disposition of said at least one bore within said load ring.

2. A rotary body according to claim 1, wherein said at least one bore includes at least two bores of about equal diameter arranged in the load ring and extending in an axial direction of the rotary body, said at least two bores being disposed adjacent to one another at approximately a same distance from a center of rotation of the rotary body, with a mutual distance between centers of the at least two bores being less than 1.5 times and greater than 0.5 times a diameter of the bores.

3. A rotary body according to claim 1, wherein said at least one bore includes a plurality of small bores, each of the small bores extending in an axial direction of the rotary body, the small bores being drilled in the load ring for removing a partial load so as to enable a balancing of the rotary body, the bores being disposed closely adjacent to one another and generally at a same distance from the center of rotation of the rotary body, a mutual distance between centers of the small bores being less than 1.5 times and greater than 0.5 times a diameter of the bores.

4. A rotary body according to claim 3, wherein each of the plurality of small bores has a different depth.

5. A rotary body according to claim 1, wherein said at least one bore includes only one bore drilled in the load ring for removing a partial load so as to enable a balancing of the rotary body, said only one bore having a small diameter and a long axial length and opening only on a side face of the load ring facing away from the disk portion.

6. A rotary body according to claim 1, wherein the at least one bore is drilled in the load ring for removing a partial load so as to enable a balancing of the rotary body, and the at least one bore has a small diameter and extends completely through the load ring.

7. A rotary body according to claim 1 wherein the load ring is cantilevered from the disk portion, as viewed in an axial cut of the rotary body, at least one further bore being arranged in the load ring, the beginning of the further bore being disposed at a position located as far as possible from an end face of the load ring facing away from the disk portion.

8. A rotary body according to claim 7, wherein the at least one further bore is disposed radially and positioned such that a longitudinal center axis of the at least one further bore is located between a center of gravity of a cross section of the load ring and the disk portion.

9. A rotary body according to claim 7, wherein said at least one bore includes a plurality of axially extending bores provided and positioned on an end face of the load ring.

10. A rotary body according to claim 9, wherein each of the plurality of axially extending bores open only on an end face of the load ring.

11. A rotary body according to claim 1, wherein the at least one bore is positioned on an end face of the load ring, the at least one bore having a depth which is at most ⅔ the axial length of the load ring.

12. A rotary body according to claim 1, including at least one further bore extending in an axial direction of the rotary body, the at least one further axially extending bore being disposed at a same peripheral position as the at least one bore and at a different radial position with respect to the center of rotation of the rotary body, a mutual distance between longitudinal center axes of the axially extending bores being greater than a distance between centers of the radially outer bore from the outer peripheral surface of the load ring together with one half of a diameter of the radial inner bore.

13. A rotary body according to claim 12, wherein the at least one further axially extending bore is arranged in the disk portion.

14. A rotary body according to claim 1, including at least one further bore extending in an axial direction of the rotary body, the at least one further axially extending bore being disposed at a different peripheral position than the at least one axially extending bore and at a different radial position with respect to the center of rotation of the rotary body, the at lest one axially extending bore and at least one further axially extending bore being spaced from each other in the peripheral direction such that lines extending tangentially through adjacent facing edges of the respective bores and passing through the center of rotation of the rotary body subtends an arcuate segment in which a radially outer bore is arranged, the arcuate segment having an arcuate length greater than twice a diameter of a largest of the respective axially extending bores.

15. A rotary body according to claim 1, including at least one further bore extending in a radial direction of the rotary body positioned in a region of the at least one axially extending bore, a distance between an axially extending center line of the at least one axially extending bore and a center line of the at least one further radially extending bore is greater than $(D/4+d/2)$, wherein D is a diameter of the at least one radially extending bore and d is a diameter of the at least one axially extending further bore.

16. A rotary body according to claim 1, including at least one further bore extending in an axial direction of the rotary body, the at least one further axially extending bore being disposed at a same peripheral position as the at least one axially extending bore and at a different radial position with respect to a center of rotation of the rotary body, a mutual distance between longitudinal center axes of the axially extending bores is greater than three times a diameter of a larger of the axially extending bores.

17. A rotary body according to claim 1, including at least one further bore extending in a radial direction of the rotary body, the at least one radially extending further bore being axially positioned along the load ring at a location such that a peripheral stress at inner surface points of the at least one radially extending further bore which are axially opposite with respect to the center of rotation of the rotary body are of the same magnitude.

18. A rotary body according to claim 1, wherein said at least one bore includes a plurality of bores each of which extend in the axial direction of the rotary body, each of the plurality of axially extending bores opening only on an end face of the load ring.

* * * * *